United States Patent
Natkanski

[15] 3,659,592
[45] May 2, 1972

[54] BLOOD PRESSURE MEASURING DEVICE

[72] Inventor: Zygmunt Natkanski, 6609 W. Melrose Street, Chicago, Ill. 60634

[22] Filed: Sept. 4, 1970

[21] Appl. No.: 69,627

[52] U.S. Cl. ..................................128/2.05 C, 128/2.05 G
[51] Int. Cl. .........................................................A61b 5/02
[58] Field of Search...................128/2.05 C, 2.05 V, 2.05 G, 128/327

[56] References Cited

UNITED STATES PATENTS

| | | | |
|---|---|---|---|
| 1,930,459 | 10/1933 | Bandoly | 128/2.05 G |
| 1,953,466 | 4/1934 | Corwin | 128/2.05 G |
| 2,405,265 | 8/1946 | McAlpine | 128/2.05 G |
| 2,560,237 | 7/1951 | Miller | 128/2.05 G |
| 3,473,525 | 10/1969 | Hanafin | 128/2.05 C |

*Primary Examiner*—Richard A. Gaudet
*Assistant Examiner*—Kyle L. Howell
*Attorney*—Pendleton, Neuman, Williams & Anderson

[57] ABSTRACT

A blood pressure measuring device is provided which is self-contained and includes an arm-wrapping member having a pouch formed therein for storage of various components of the device without requiring disconnection of said components. When not in use the device may be formed into a compact roll. Complemental fastening means are provided on the arm-wrapping member for securing the latter in either an arm-wrapping position or in the compact roll position.

8 Claims, 10 Drawing Figures

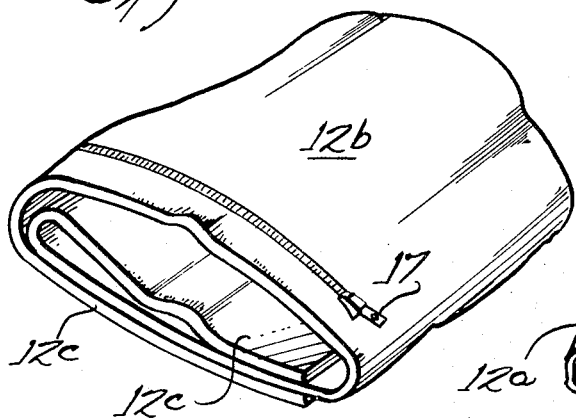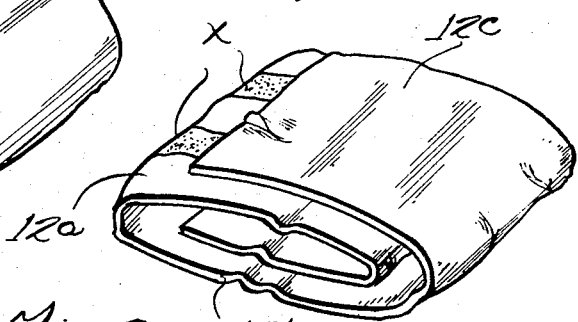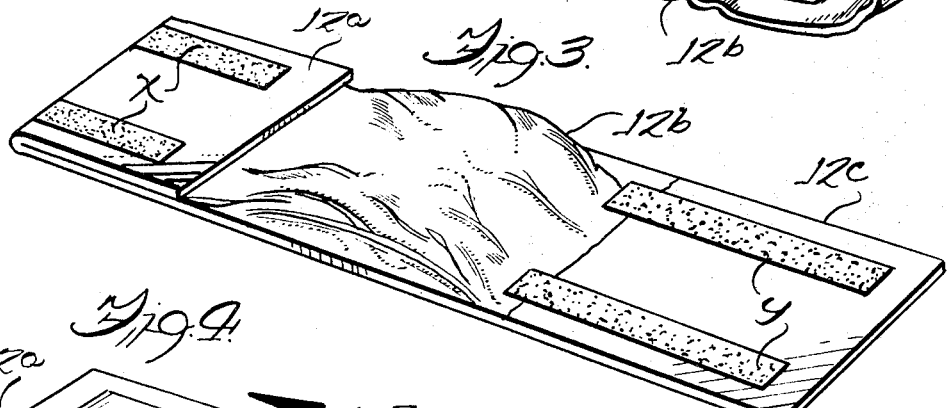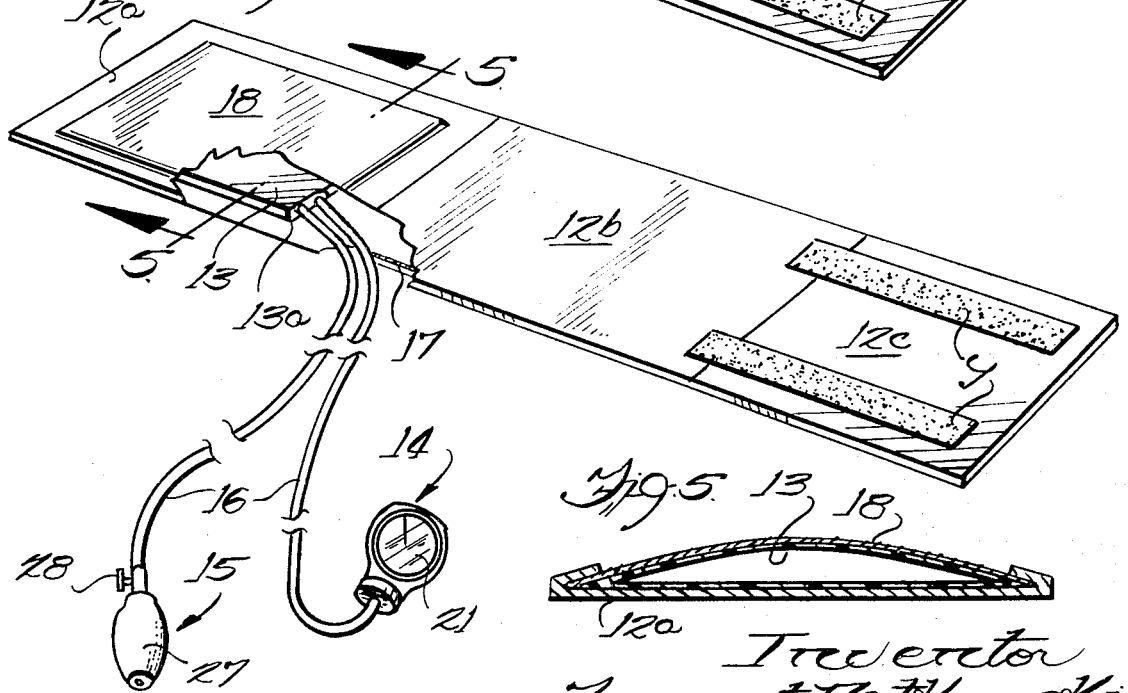

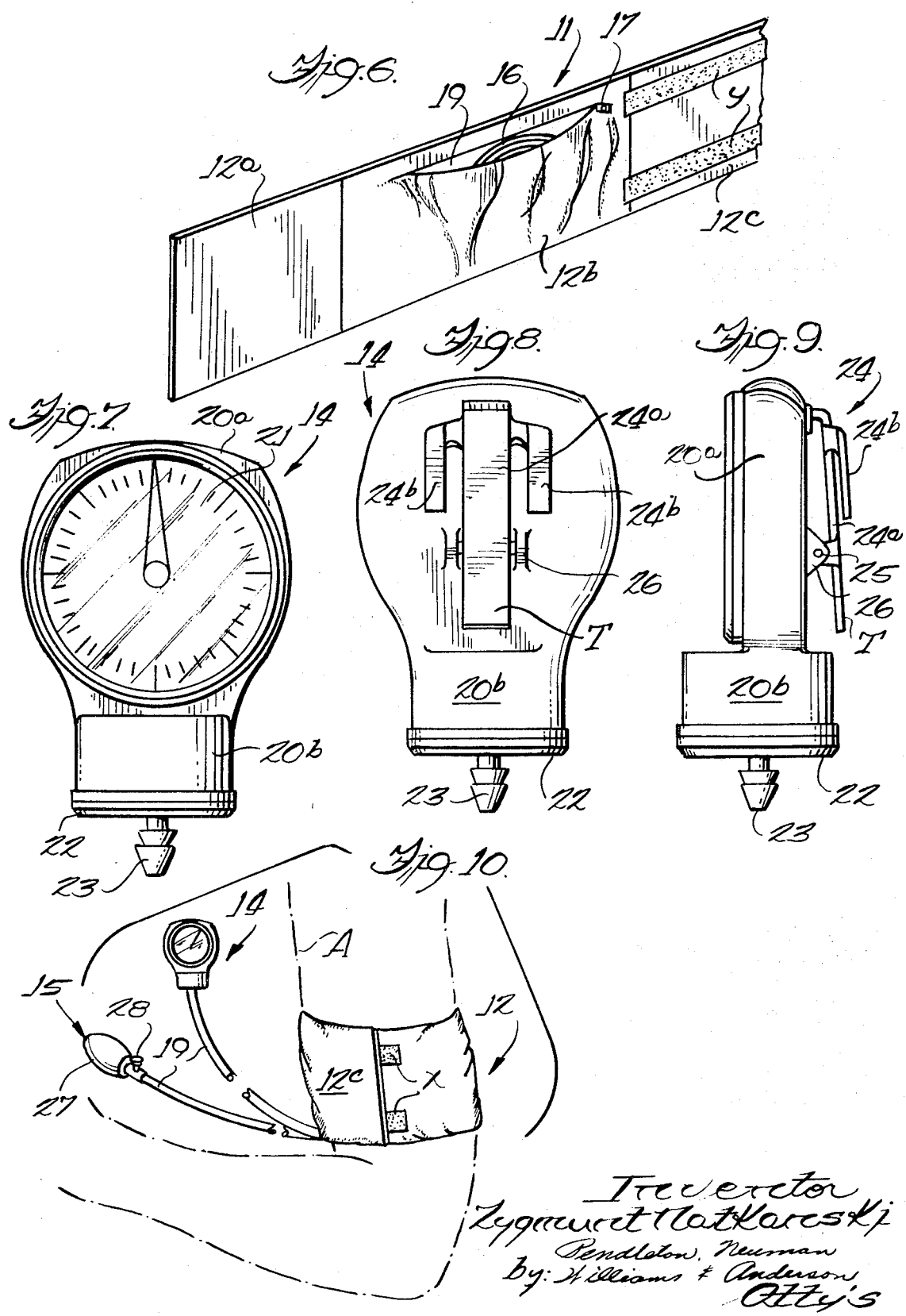

BLOOD PRESSURE MEASURING DEVICE

BACKGROUND OF THE INVENTION

Various blood pressure measuring devices have heretofore been provided which because of certain structural characteristics are beset with one or more of the following shortcomings: (a) the device is bulky and awkward to handle, (b) the various component parts comprising the device must be disconnected when the device is to be stored, (c) the measurement taken is susceptible to error, (d) replacement of the various component parts is a difficult manipulation, (e) the device is uncomfortable to wear, and (f) a separate carrying case for the device is required.

SUMMARY OF THE INVENTION

Thus, it is an object of this invention to provide a blood pressure measuring device which avoids all of the shortcomings aforenoted.

It is a further object of this invention to provide a blood pressure measuring device which does not require the pressure indicator therefor to be placed in a predetermined position before an accurate reading can be made.

It is a still further object of this invention to provide a blood pressure measuring device which is self-contained, compact, and attractive in appearance.

Further and additional objects will appear from the description, accompanying drawings, and appended claims.

In accordance with one embodiment of this invention, a blood pressure measuring device is provided which includes an elongated arm-wrapping member having a storage pouch formed therein. The member is provided with a hollow end portion in which is disposed an inflatable unit. One surface of the end portion which is adapted to engage the arm surface of the patient is more pliable than the opposite surface of the member forming the hollow end portion. A pressure indicator and a pump means are connected by flexible tubing to the inflatable unit. The flexible tubing extends from the hollow end portion through the storage pouch, thus enabling the tubing, pressure indicator, and pump means, when not in use, to be stored within the pouch without having to be disconnected from the inflatable unit.

DESCRIPTION

For a more complete understanding of the invention reference should be made to the drawings wherein:

FIGS. 1 and 2 are perspective views of the improved device in a compact roll suitable for storage.

FIG. 3 is a perspective view of the improved device in a partially unrolled state.

FIG. 4 is similar to FIG. 3, but showing the device in a fully unrolled state with the pressure indicator and the pump means removed from the storage pouch; a segment of the surface of the member forming the hollow end portion being cut away so as to expose the inflatable unit disposed therein.

FIG. 5 is an enlarged sectional view taken along line 5—5 of FIG. 4.

FIG. 6 is a perspective view of the improved device showing the storage pouch open and with various components disposed therein.

FIGS. 7, 8, and 9 are enlarged front, back, and side elevational views, respectively, of one form of the pressure indicator utilized in said improved device.

FIG. 10 is a fragmentary perspective view showing the improved device applied to the arm of a patient.

Referring now to the drawings and more particularly to FIG. 4, an improved blood pressure measuring device 11 is shown which includes an elongated arm-wrapping member 12, an inflatable unit 13 disposed within a hollow end portion 12a of the member, a pressure indicator 14, a manually operable pump 15, and flexible tubing 16 for connecting the indicator and pump to a corner 13a of the inflatable unit. The member 12, sometimes referred to as a cuff, has a central portion 12b, and a second end portion 12c.

Forming a part of the central portion 12b is a storage pouch 19, see FIG. 6, into which are placed the indicator 14, pump 15, and tubing 16, when the devices is not in use. The open side of the pouch may be provided with an elongated zipper 17 or the like for closing the pouch, when desired.

It should be noted that the tubing 16 extends from the corner 13a of the unit 13 through an interior passageway into the interior of the pouch 19, so that storage of the tubing, indicator, and pump in the pouch may be readily accomplished without requiring disconnection of any of the component parts. With the improved device no separate carrying case is required into which the device is placed when not in use. Thus, the improved device is self-contained and the possibility of one or more of the components being lost or misplaced is avoided.

One surface of member 12 forming the hollow end portion 12a may be formed of a pliable piece 18 which has the margin thereof secured by stitching or other suitable means to the adjacent material forming the remainder of the end portion. The pliability of piece 18 is preferably greater than that of the material forming the remainder of the member 12. When the member 12 is applied to the arm A of the patient, see FIG. 10, the exposed side of pliable piece 18 is placed against and in contact with the arm surface. Upon unit 13 being inflated, the pliable piece 18 will distort to a substantially greater extent than the opposite surface of the end portion 12a, thereby causing a substantially greater proportion of the inflating pressure of the unit 13 to be exerted against the arm of the patient. Thus, a smaller amount of inflating of the unit is required in order to produce the necessary pressure on the arm so as to transmit the impulses to the indicator 14. By reason of the reduced inflation of the unit 13, the member 12 is more comfortable to wear. Furthermore, the thinness and pliability of the piece 18 minimizes the dampering effect, such piece, if thicker, would otherwise produce on the measured impulse.

The length of the member 12 should be such that it will completely encircle the upper arm portion of the patient, notwithstanding that the peripheral dimension of said upper arm portion varies over a wide range.

To retain the member 12 in an arm-wrapping position, see FIG. 10, one or more strips X and Y of Velcro material may be applied to the outer surface of member end portion 12c, see FIGS. 3, 4, and 6. Strips X provided on end portion 12a are in longitudinal alignment with strips Y provided on end portion 12c, thereby facilitating mating of the complemental strips when the member is brought into encircling relation with the patient's arm. In lieu of Velcro strips, other fastening means such as snaps, hooks and eyes, etc. may be utilized for such purpose. The fastening means also serves to retain the member 12 in a compact rolled condition, such as illustrated in FIGS. 1 and 2. When in such a rolled condition, the improved device may be readily carried or stored.

To obtain the most compact roll, it is desirable that end portion 12a be folded upon itself so that the fastener strips X will be exposed on both the top and bottom, see FIG. 3. By so folding the end portion, the pliable piece 18 is concealed. The folded end portion 12a is then folded so as to overlie the central portion 12b. Because the pouch 19 of the central portion 12b is filled with the tubing 16, pump 15, and indicator 14, the surface of the central portion will be uneven; however, this presents no problem because the folded end portion 12a is capable of deforming and will conform to a certain extent to the uneven surface configuration of portion 12b. The other end portion 12c is then folded over the twice folded end portion 12a, so that the complemental fastening means will mate with one another, see FIG. 2. As seen in FIG. 1, when the member 12 is in its rolled state, the pouch-closing means (e.g. zipper) 17 is exposed.

To minimize the bulging effect produced when the components are stored in the pouch 19, the indicator 14 should have a thin profile. A preferred form of the indicator 14 is shown in FIGS. 7–9. The illustrated indicator 14 includes a casing 20 which may be of one piece construction. The upper portion 20a of the casing forms a framelike housing for the dial and pointer assembly 21, the latter may be a manometer of conventional construction. The lower portion 20b of the casing is in the form of a cylinder. Secured to the bottom of portion 20b is a closure piece 22 which is provided with a depending nipple 23. The exterior of the nipple may be of serrated configuration so as to frictionally retain thereon an end 16a of the tubing which is slipped thereover, see FIG. 7.

Secured to the backside of the casing upper portion 20a is a spring clip 24 which enables the indicator 14 to be secured to a sheet, pillow-case, shirt pocket or the like while a measurement is being taken. The illustrated clip is mounted so as to pivot about a pin 25 having the ends thereof engaging a pair of spaced ears 26 formed on the casing 20, see FIGS. 8 and 9. The clip 24 comprises an elongated center section 24a having the upper end thereof serrated and offset inwardly so as to engage the exposed rear surface of the casing upper portion 20a, see FIG. 9. The center section 24a, as seen in FIG. 9, is biased in a counterclockwise direction about pin 25 as an axis. A portion of center section 24a extends downwardly from pivot pin 25 so as to form a finger tab T for releasing the clip when desired.

Extending laterally from the upper portion of center section 24a and offset outwardly therefrom is a pair of fingers 24b. Because of the offsetting of the fingers relative to center section 24a, the indicator 14 may, if desired, be readily slipped onto and hung from a belt or loop.

Various other types of clips or the like may be substituted for the spring clip 24.

Pump 15 may be of conventional design and includes a squeezable bulb-shaped member 27 which is sized so as to fit comfortably in a hand. Affixed to the forward or discharge end of member 27 is a bleeder valve 28 which is manually adjustable so as to control the rate of deflation of the unit 13. Disposed forwardly of valve 28 is a nipple, not shown, but similar to that formed on indicator 14 and which is adapted to be frictionally engaged by one end of the tubing 16.

Member 27 is provided at the rear end thereof with an inlet valve 30 through which air is drawn into the interior of the member as the latter is released from a squeezed condition.

The cuff 12, except for the pliable piece 18, may be formed of a variety of sheet materials such as leather, simulated leather, colorful plastics, or various types of cloth. The cuff material should be soft enough so as to readily encircle the arm of the patient, but tend to resist distortion when the unit 13 is inflated. Furthermore, the cuff material should not be adversely affected by temperature variations, and should be moisture and dirt resistant.

Thus, it will be seen that an improved blood pressure measuring device has been provided which is self-contained, is compact and capable of being readily stored when not in use, is accurate, and may be readily utilized by one not technically trained.

I claim:

1. A blood pressure measuring device comprising a flexible arm-wrapping member having a storage pouch integral therewith and forming a part thereof and a hollow first end portion and a second end portion; inflatable means disposed within said hollow end portion; pressure indicating means; pump means; flexible conduit means connecting said pressure indicating means and said pump means to said inflatable means, said conduit means extending from the interior of said hollow end portion into said pouch; pouch-closing means mounted on said member; and complemental fastening means mounted on said first and second end portions and cooperating with one another for releasably retaining said member in arm-wrapping position said pump means, said flexible conduit means, and said pressure indicating means being sized to be capable of being placed within said pouch for storage.

2. The blood pressure measuring device of claim 1 wherein said device, when not in use, having the arm-wrapping member thereof adapted to assume a compact rolled condition for storage; said complemental fastening means being in registered relation with one another when said member in said compact rolled condition.

3. The blood pressure measuring device of claim 1 wherein said member, when in arm-wrapping relation, having a surface of said first end portion adapted to be in contact with the arm of the patient; said first end portion surface being substantially more pliable than the opposite surface of said first end portion; said inflatable means being sandwiched between said first end portion surfaces.

4. The blood pressure measuring device of claim 2 wherein said member, said inflatable means, said pressure indicating means, said pump means, said conduit means, said pouch-closing means, and said complemental fastening means being interconnected when in said compact rolled condition.

5. The blood pressure measuring device of claim 3 wherein the said opposite surface of said first end portion has a part of said complemental fastening means mounted on the exterior thereof.

6. The blood pressure measuring device of claim 1 wherein said pouch is formed in a central portion of said arm-wrapping member and the opening for said pouch extends substantially the full length of said central portion.

7. The blood pressure measuring device of claim 1 wherein the pouch-closing means is exposed when said member is in arm-wrapping position.

8. The blood pressure measuring device of claim 1 wherein the pressure-indicating means comprises a casing provided with a cavity, a port formed in said casing and having one end thereof terminating at the exterior of said casing and the opposite end terminating within said cavity, a dial and indicator assembly mounted within said cavity, attaching means mounted on the exterior of said casing opposite said dial and indicator assembly; and connector means mounted on said casing and communicating with one end of said port.

* * * * *